United States Patent
Gucea et al.

(10) Patent No.: US 11,907,040 B2
(45) Date of Patent: Feb. 20, 2024

(54) MEMORY POWER MANAGEMENT METHOD AND PROCESSOR SYSTEM

(71) Applicant: NXP USA, Inc., Austin, TX (US)

(72) Inventors: Doru Cristian Gucea, Bragadiru Village (RO); Teodor Cosmin Grumei, Pitesti (RO); Andrei Istodorescu, Magurele (RO)

(73) Assignee: NXP USA, Inc., Austin, TX (US)

( * ) Notice: Subject to any disclaimer, the term of this patent is extended or adjusted under 35 U.S.C. 154(b) by 428 days.

(21) Appl. No.: 17/303,908

(22) Filed: Jun. 10, 2021

(65) Prior Publication Data
US 2022/0035434 A1 Feb. 3, 2022

(51) Int. Cl.
*G06F 1/3234* (2019.01)
*G06F 1/3287* (2019.01)
*G06F 8/75* (2018.01)
*H04L 9/40* (2022.01)
*G06F 12/06* (2006.01)

(52) U.S. Cl.
CPC .......... *G06F 1/3275* (2013.01); *G06F 1/3287* (2013.01); *G06F 8/75* (2013.01); *G06F 12/06* (2013.01); *H04L 63/0442* (2013.01); *H04L 63/166* (2013.01)

(58) Field of Classification Search
CPC ........ G06F 1/3275; G06F 1/3287; G06F 8/75; G06F 12/06; H04L 63/0442; H04L 63/166
USPC ........................................................ 711/170
See application file for complete search history.

(56) References Cited

U.S. PATENT DOCUMENTS

| | | | | |
|---|---|---|---|---|
| 7,100,013 | B1* | 8/2006 | de Waal | G06F 1/3225 711/170 |
| 2005/0262324 | A1* | 11/2005 | Mathiske | G06F 9/5016 711/170 |
| 2006/0149915 | A1* | 7/2006 | Maly | G06F 12/023 711/172 |
| 2007/0198799 | A1* | 8/2007 | Shinohara | G06F 3/067 711/170 |
| 2010/0138460 | A1* | 6/2010 | Ogasawara | G06F 12/0276 711/170 |
| 2010/0250981 | A1* | 9/2010 | Pamley | G06F 1/3203 713/320 |

(Continued)

FOREIGN PATENT DOCUMENTS

KR 10-1803284 B1 12/2017
WO PCT-2019118096 A1 6/2019

*Primary Examiner* — Christopher B Shin (57) ABSTRACT

The processor system includes a processor coupled to a memory having a plurality of memory banks and a region configurable as a heap region. At least one memory bank is allocated to the heap region dependent on a predetermined memory size required for execution of at least one cryptographic operation. At least one further memory bank is allocated to the heap region. The processor system may switch between first and second operating states. The first operating state has a lower power consumption than the second operating state. The processor system switches between a first and second operating mode by setting at least one memory bank and at least one further memory bank to an active state. The processor system switches between the second and first operating mode by setting at least one memory bank to a retention state and the at least one further memory bank to a power-down state.

20 Claims, 8 Drawing Sheets

(56) References Cited

U.S. PATENT DOCUMENTS

| | | | |
|---|---|---|---|
| 2014/0129757 A1* | 5/2014 | Lo .................... | G06F 12/023 711/E12.008 |
| 2015/0046732 A1* | 2/2015 | Chun ................. | G06F 12/0607 713/323 |
| 2018/0253556 A1* | 9/2018 | Karaginides .......... | G06F 21/572 |
| 2022/0035434 A1* | 2/2022 | Gucea .................. | G06F 8/75 |

* cited by examiner

MEMORY POWER MANAGEMENT METHOD AND PROCESSOR SYSTEM

CROSS-REFERENCE TO RELATED APPLICATIONS

This application claims the priority under 35 U.S.C. § 119 of Romania application no. A202000485, filed on 31 Jul. 2020, the contents of which are incorporated by reference herein.

FIELD

This disclosure relates to a method for memory power management and processor system including power management.

BACKGROUND

Low power processor systems such as microcontrollers may be configured to operate as Internet of Things (IoT) devices which may have a relatively long inactive period and a shorter active period of operation. During the inactive period, the IoT system including the microcontroller may be in a sleep mode to minimize the power consumption. The device may then transition from the sleep mode to an active mode to execute the required operations before transitioning back to a sleep mode. In particular, devices which operate as end-points in a network such as a Zigbee or other network may operate as a so-called sleepy device. Such a device when included in a network may also have to execute one or more cryptographic operations when in active mode for example to authenticate the device within the network or to authenticate a particular data transfer.

SUMMARY

Various aspects of the disclosure are defined in the accompanying claims.

In a first aspect there is provided a method of power management for a processor system, the processor system including a processor coupled to a memory, wherein the comprises a plurality of memory banks, the memory further comprising a region configurable as a heap region, wherein the processor is operable to execute instructions comprising one or more cryptographic operations; and wherein the method comprises: allocating at least one memory bank to the heap region dependent on a predetermined memory size required for execution of at least one cryptographic operation; allocating at least one further memory bank to the heap region; and switching from a first operating mode to a second operating mode by setting the at least one memory bank to an active state; setting the at least one further memory bank to an active state; switching from the second operating mode to the first operating mode by: setting the at least one memory bank to a retention state; setting the at least one further memory bank to a power-down state.

In one or more embodiments, the at least one memory bank may be configured to store a public key.

In one or more embodiments, the at least one cryptographic operation may comprise a transport layer security (TLS) handshake operation.

In one or more embodiments, the at least one cryptographic operation may comprise at least one of an encryption operation and a decryption operation.

In one or more embodiments, the at least one memory bank and the at least one further memory bank may be non-contiguous.

In one or more embodiments, allocating at least one memory bank to the heap region may further comprise dividing the heap region into a plurality of sections, each section corresponding to a respective memory bank.

In one or more embodiments, the method may further comprise providing an identifier for each cryptographic operation, providing the required heap size for each cryptographic operation and providing a section identifier comprising the address of a memory bank used as a starting point for each cryptographic operation.

In one or more embodiments, the method may further comprise switching from the first operating mode to the second operating mode by: setting a first memory bank to the active state; checking whether the section identifier corresponds to the first memory bank; in response to the section identifier corresponding to the first memory bank, determining whether the heap size exceeds the available memory in the first memory bank; in response to the heap size exceeding the available memory in the first memory bank; setting a second memory bank to the active state; in response to the section identifier not corresponding to the first memory bank, setting a third memory bank corresponding to the section identifier to the active state.

In one or more embodiments, the method may further comprise checking whether the section identifier corresponds to the first memory bank; allocating the first memory bank to the heap region; in response to the section identifier corresponding to the first memory bank, determining whether the heap size exceeds the available memory in the first memory bank; in response to the heap size exceeding the available memory in the first memory bank; allocating a second memory bank to the heap region; in response to the section identifier not corresponding to the first memory bank, allocating a third memory bank corresponding to the section identifier to the heap region.

In one or more embodiments, the method may further comprise determining the predetermined memory size required for execution of at least one cryptographic operation by: determining the memory size to store the crypto-session elements for the at least one cryptographic operation; determining the memory size to store the at least one cryptographic operation.

In one or more embodiments, determining the predetermined memory size required for execution of at least one cryptographic operation may further comprise running a static code analysis and a run-time code analysis.

In a second aspect there is provided a processor system comprising a processor coupled to a memory comprising a plurality of memory banks, the memory further comprising a region configurable as a heap region, wherein the processor is operable to execute instructions comprising one or more cryptographic operations; and wherein the processor system is configured to: allocate at least one memory bank to the heap region dependent on a predetermined memory size required for execution of at least one cryptographic operation; allocate at least one further memory bank to the heap region; further configured to switch from a first operating mode to a second operating mode by: setting the at least one memory bank to an active state; setting the at least one further memory bank to an active state; and further configured to switch from the second operating mode to the first operating mode by setting the at least one memory bank to a retention state and setting the at least one further memory bank to a power-down state.

In one or more embodiments, the processor system may be further configured to provide an identifier for each cryptographic operation, provide the required heap size for each cryptographic operation and provide a section identifier comprising the address of a memory bank used as a starting point for each cryptographic operation.

In one or more embodiments, the processor system may be further configured switch between a first operating mode and a second operating mode by setting a first memory bank to the active state; checking whether the section identifier corresponds to the first memory bank; in response to the section identifier corresponding to the first memory bank, determining whether the heap size exceeds the available memory in the first memory bank; in response to the heap size exceeding the available memory in the first memory bank; setting a second memory bank to the active state; in response to the section identifier not corresponding to the first memory bank, setting a third memory bank corresponding to the section identifier to the active state.

In one or more embodiments, the processor system may be further configured to check whether the section identifier corresponds to the first memory bank; allocate the first memory bank to the heap region; in response to the section identifier corresponding to the first memory bank, determining whether the heap size exceeds the available memory in the first memory bank; in response to the heap size exceeding the available memory in the first memory bank; allocating a second memory bank to the heap region; in response to the section identifier not corresponding to the first memory bank, allocating a third memory bank corresponding to the section identifier to the heap region.

In third aspect, there is provided a non-transitory computer readable media comprising a computer program comprising computer executable instructions which, when executed by a processor system including a processor coupled to a memory comprising a plurality of memory banks, causes the processor to perform the steps of allocating at least one memory bank to the heap region dependent on a predetermined memory size required for execution of at least one cryptographic operation; allocating at least one further memory bank to the heap region; and: switching from a first operating mode to a second operating mode by setting the at least one memory bank to an active state; setting the at least one further memory bank to an active state; and switching from the second operating mode to the first operating mode by: setting the at least one memory bank to a retention state; setting the at least one further memory bank to a power-down state.

In one or more embodiments, the non-transitory computer readable media may further comprise computer executable instructions which causes the processor to perform the steps of allocating at least one memory bank to the heap region further comprises dividing the heap region into a plurality of sections, each section corresponding to a respective memory bank.

In one or more embodiments, the non-transitory computer readable media may further comprise computer executable instructions which causes the processor to perform the steps of providing an identifier for each cryptographic operation, providing the required heap size for each cryptographic operation and providing a section identifier comprising the address of a memory bank used as a starting point for each cryptographic operation.

In one or more embodiments, the non-transitory computer readable media may further comprise computer executable instructions which causes the processor to perform the steps of switching between the first operating mode and the second operating mode by: setting a first memory bank to the active state; checking whether the section identifier corresponds to the first memory bank; in response to the section identifier corresponding to the first memory bank, determining whether the heap size exceeds the available memory in the first memory bank; in response to the heap size exceeding the available memory in the first memory bank; setting a second memory bank to the active state;

in response to the section identifier not corresponding to the first memory bank, setting a third memory bank corresponding to the section identifier to the active state.

In one or more embodiments, the non-transitory computer readable media may further comprise computer executable instructions which causes the processor to perform the steps of checking whether the section identifier corresponds to the first memory bank; allocating the first memory bank to the heap region; in response to the section identifier corresponding to the first memory bank, determining whether the heap size exceeds the available memory in the first memory bank; in response to the heap size exceeding the available memory in the first memory bank; allocating a second memory bank to the heap region; in response to the section identifier not corresponding to the first memory bank, allocating a third memory bank corresponding to the section identifier to the heap region.

BRIEF DESCRIPTION OF THE DRAWINGS

In the figures and description like reference numerals refer to like features. Embodiments are now described in detail, by way of example only, illustrated by the accompanying drawings in which.

DETAILED DESCRIPTION

Figure 1A:
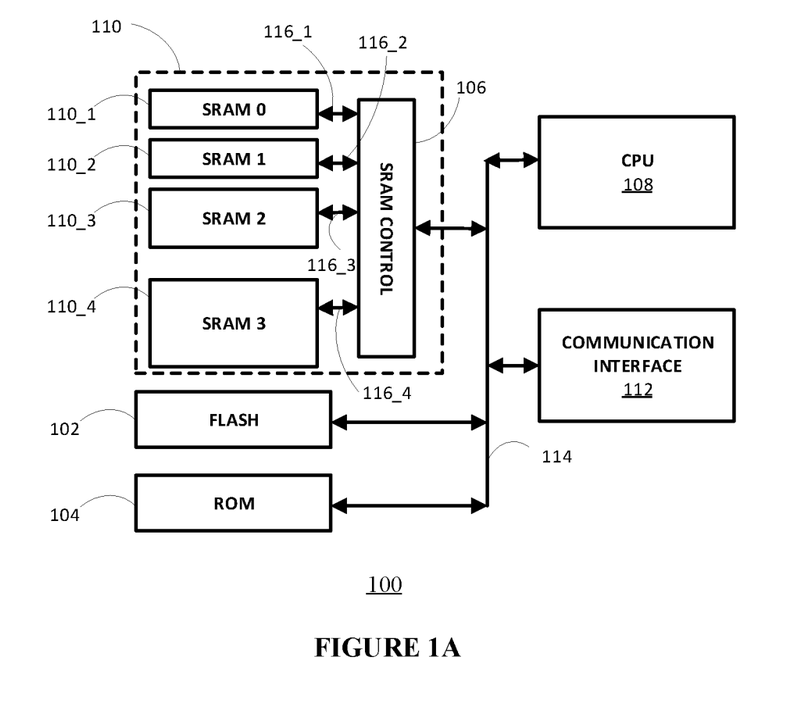
FIG. 1A shows an example processor system.

FIG. 1A shows an example processor system 100. The processor system 100 may be a single device including a central processing unit (CPU) 108 which may be a microprocessor or microcontroller. The CPU 108 may include a number of registers including a stack pointer register. The processor system 100 may further include a communication interface 112 which may be for example a wired or wireless transceiver for communication with other devices, a static random access memory (SRAM) 110, a read only memory (ROM) 104 and a non-volatile Flash memory 102. The Flash 102 and ROM 104 may store the software or firmware executable by the CPU 108. The SRAM 110 may include a number of memory banks 110_1, 110_2, 110_3, 110_4 of different sizes coupled to an SRAM controller 106 by connections 116_1, 116_2, 116_3, 116_4.

In processor system 100 four memory banks are shown but in other examples fewer or more memory banks may be used. In other example systems more than one SRAM controller 106 may be used to control further memory banks. The CPU 102, communication interface 112, SRAM controller 106, ROM 104 and Flash 102 may be coupled together via a communication bus 114. In some examples the processor system 100 may be implemented on a single device for example a system-on-chip (SoC). In some examples one or more of the Flash 102, ROM 104 and the SRAM 110 may be implemented on a separate device or separate devices.

The SRAM controller 106 may control the memory banks 110_1, 110_2, 110_3, 110_4 and provide data access to the communication bus 114. The SRAM controller 106 may control the power to each memory bank 110_1, 110_2, 110_3, 110_4 independently according to the following operating states.

An active state: the SRAM controller 106 and one or more of the activated memory bank 110_1, 110_2, 110_3, 110_4 may have power applied and clocks supplied where necessary.

A retention state: a respective memory bank 110_1, 110_2, 110_3, 110_4 cannot be read but data in the memory may be retained. This may reduce the power consumption required by the memory bank compared with the active state.

A down state: no power is supplied to the respective memory bank 110_1, 110_2, 110_3, 110_4 and any data is lost.

The processor system 100 may also include other peripherals (not shown) which may be coupled to the communication bus 114. The SRAM controller 106 and other peripherals may have interrupt connections (not shown) to the CPU 102. The term SRAM as used in the present disclosure may refer to a volatile read-write memory which loses information when power is removed. The term non-volatile memory may refer to any read-write memory which retains information when power is removed, for example Flash memory. Memory addresses as referred to in the present disclosure may refer to physical addresses or virtual addresses.

Figure 1B:
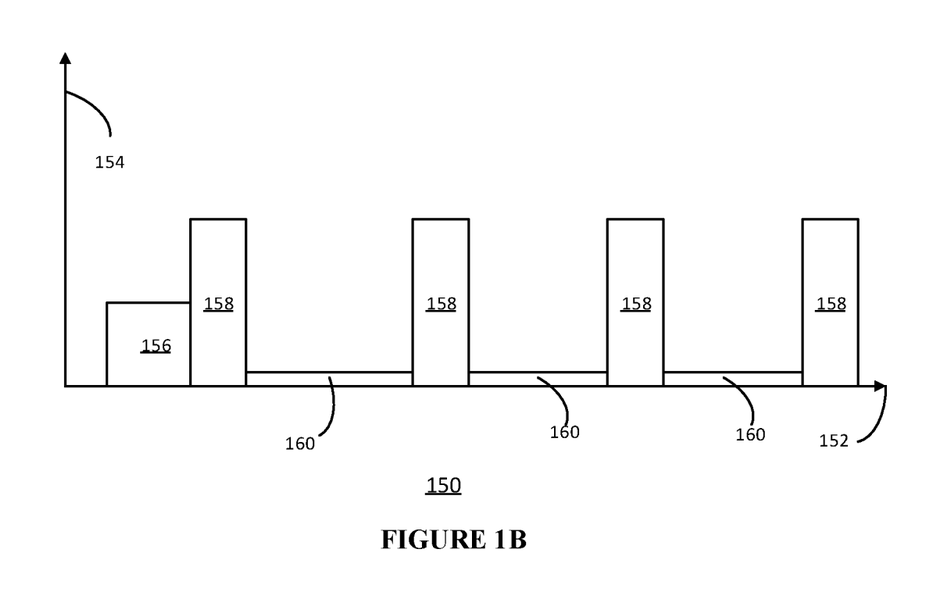
FIG. 1B illustrates an example operation of the processor system of FIG. 1A configured as an IoT network device.

FIG. 1B illustrates a plot 150 of the power consumption on the y-axis 154 versus time on the x-axis 152 in different operating modes for the processor system 100 configured as an IoT device. During an initial phase 156 following device power on, the IOT device may execute a full start-up following which the IOT device may be in a phase of normal operation 158 which may be referred to as a wake cycle or wake up cycle. Phases 156 and 158 may consume relatively large amounts of power. Following completion of the normal operation of the IOT device which may include activities such as authentication and RF advertising if the IOT device is a wireless device, the IOT device may execute a power-down operation to switch to a lower power mode which may be a standby or sleep mode during an inactive time period 160 which may be a much longer period compared to the active period 158. The IOT device may then repeatedly switch or transition between a normal operating mode during the active phase 158 and the lower-power mode during the inactive phase 160.

Figure 2:
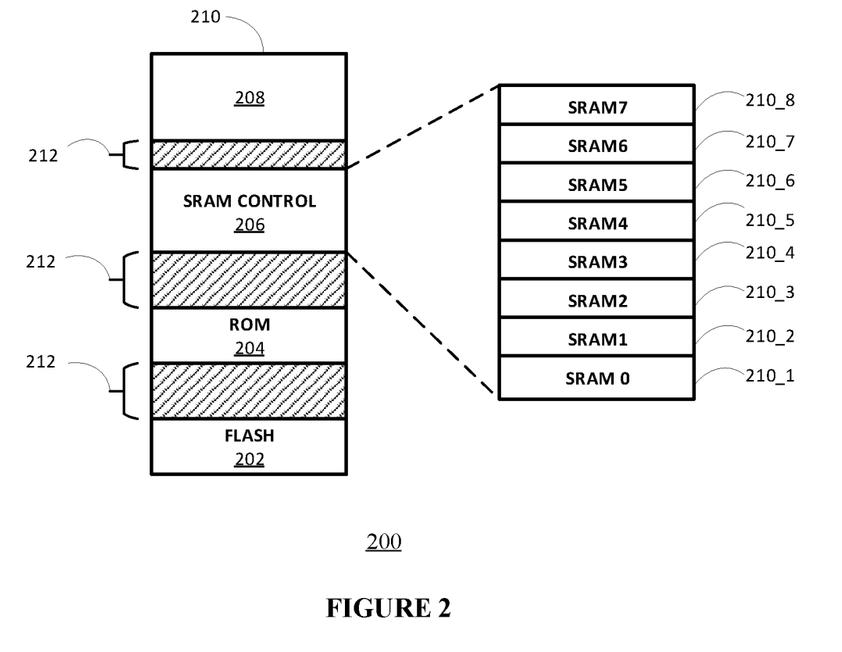
FIG. 2 illustrates an example memory map and SRAM memory map for a processor system.

FIG. 2 shows an example memory map 200 for a processor system having an SRAM controller and eight memory banks. The main memory map 214 consists of a flash region 202, a rom region 204, an SRAM control region 206 and a further region 208. The main memory map 210 also has reserved memory regions. The size of the SRAM control region corresponds to the total memory of each of the memory modules 210_1 to 210_8.

Figure 3:
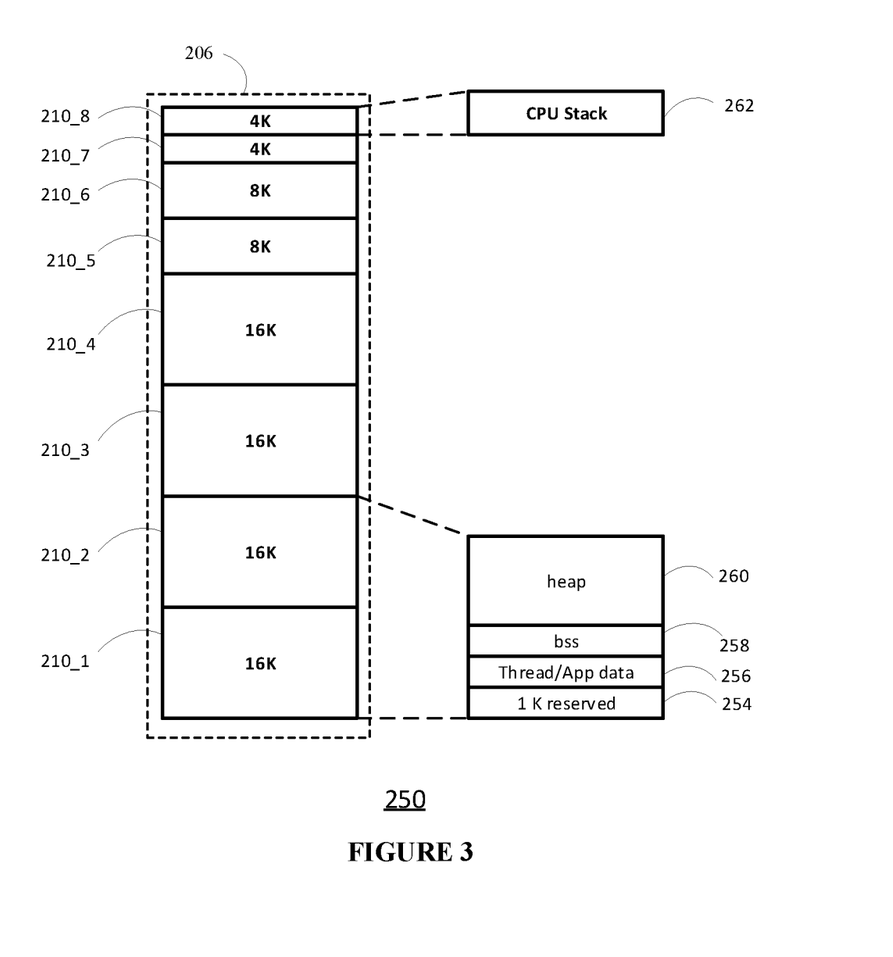
FIG. 3 shows an example memory placement of linker sections a processor system.

FIG. 3 shows an example linker placement 250 for an application that shows a typical algorithm using the different states of the memory banks of FIG. 2. This example is based on the OpenThread stack which is a mesh networking stack for low-power devices over IPv6. A MTD (Minimal Thread Device) application built with the Mbed Transport Layer Security (TLS) library implements the TLS and Secure sockets layer (SLL) protocols together with the respective cryptographic algorithms. Table 1 shows the following sections of classical layout for a C program for an ARM-based processor system for the example application:

TABLE 1

| Text | Data | Bss | Total (Dec) | Total (Hex) |
|---|---|---|---|---|
| 249832 | 612 | 26364 | 276808 | 43948 |

Two banks of 16 Kb 210_1, 210_2 are used mainly for a reserved section 254, Thread and Application Data 256 section, bss section 258, and Heap 260 while one 4 Kb bank 210_8 is used for the Stack 262. During sleep cycles, these 3 memory banks 210_1, 210_2 and 210_8 are kept in retention state for saving power. The Power manager controls the memory controller to shut down the memory banks 210_3, 210_4, 210_5, 210_6, 210_7.

The Bss section includes approximately 26 Kb. Part of this section is 12 Kb of the heap space needed for cryptographic operations. In this example application, the memory for the heap region is partly using predefined blocks of memory in the application code which are reserved during compile-time rather than blocks which are dynamically allocated and freed during run-time, for example using the C programming language malloc( ) and free( ) function calls. In this case the heap is at least partly indicated as being part of the Bss section but it will be appreciated that the heap region may be considered to be a separate region in memory. The Heap space starts in the first 16 Kb bank 210_1 and ends in the second 16 Kb bank 210_2.

```
/**
 * @def OPENTHREAD_CONFIG_HEAP_SIZE
 *
 * The size of the heap buffer when DTLS is enabled.
 *
 */
#ifndef OPENTHREAD_CONFIG_HEAP_SIZE
#if OPENTHREAD_ENABLE_APPLICATION_COAP_SECURE
#define OPENTHREAD_CONFIG_HEAP_SIZE (3072 * sizeof(void *))
#else
#define OPENTHREAD_CONFIG_HEAP_SIZE (1536 * sizeof(void *))
#endif // OPENTHREAD_ENABLE_APPLICATION_COAP_SECURE
#endif // OPENTHREAD_CONFIG_HEAP_SIZE
```

The inventors of the present disclosure have appreciated that there are multiple problems using the memory allocation method 250:

During sleep cycles the second 16 Kb memory bank 210_2 is automatically put in retention mode but it may be that no buffer from that bank is in use because crypto operations are finished before entering a sleep mode. In this case the second memory bank 210_2 could have been put in down mode safely;

During sleep cycles, depending on the memory allocation scheme and on the fragmentation level, it might be impossible to put the second 16 Kb memory bank 210_2 in down mode: a single buffer allocated here forces the power manager to keep the bank in the retention state;

During wake-up cycles, for example when switching from an inactive or sleep operating mode to an active or normal operating mode the second 16 Kb memory bank 210_2 is put in the active state even if no crypto operations are computed and this bank is not accessed during the current wake-up cycle;

Using a 16 Kb buffer for a simple crypto operation that requires much less memory leads to unnecessary power consumption.

Figure 4:
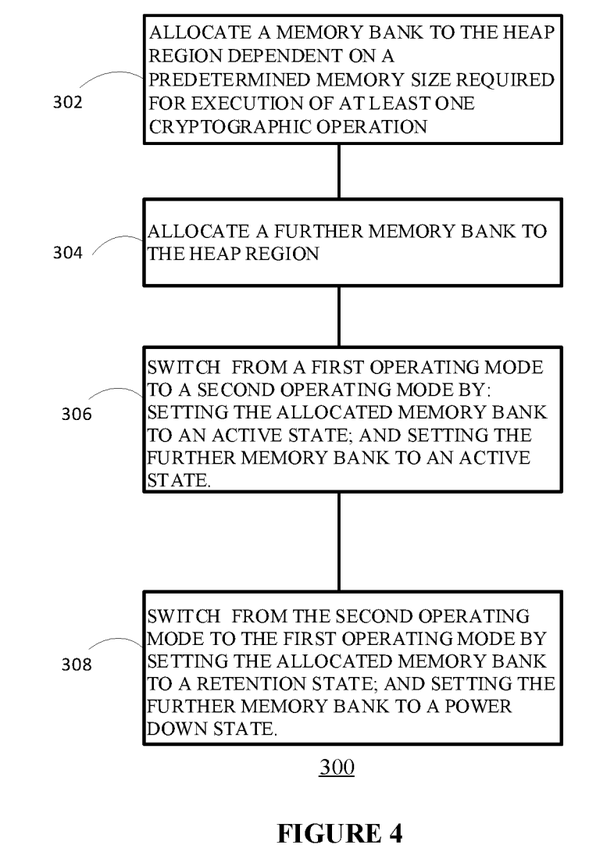
FIG. 4 shows a method of memory power management according to an embodiment.

FIG. 4 shows a method of memory power management 300 according to an embodiment. The method 300 may be applied to a processor system, for example the processor system 100 having multiple memory banks of SRAM. In step 302 a memory bank may be allocated to the heap region dependent on a predetermined memory size required for the execution of at least one cryptographic operation. In step 304 a further memory bank may be allocated to the heap region. In step 306 during a transition or switch from a first phase of a first low power operating mode which may be a sleep mode to a higher power operating mode which may be a normal operating mode, the allocated memory bank may be set to an active state and the further memory bank may also be set to an active state. In step 308 during a transition or switch from the second higher power operating mode to the first lower power operating mode, the allocated memory bank may be set to a retention state and the further memory bank may be set to an inactive or power-down state. The first operating mode may include operating modes such as sleep mode or standby mode or where a device is powered off. The term operating mode as used in the present disclosure may include modes in which a device implementing the method is inactive as well as active.

The method 300 uses precomputed required space for each crypto operation such that the heap space can be split in multiple regions by taking into consideration the size of the SRAM banks. Using this method, the smallest memory bank is put in the active state only when a crypto computation is imminent. This precomputed required space for each crypto operation might be determined by a combination of static and runtime code analysis.

Figure 5:
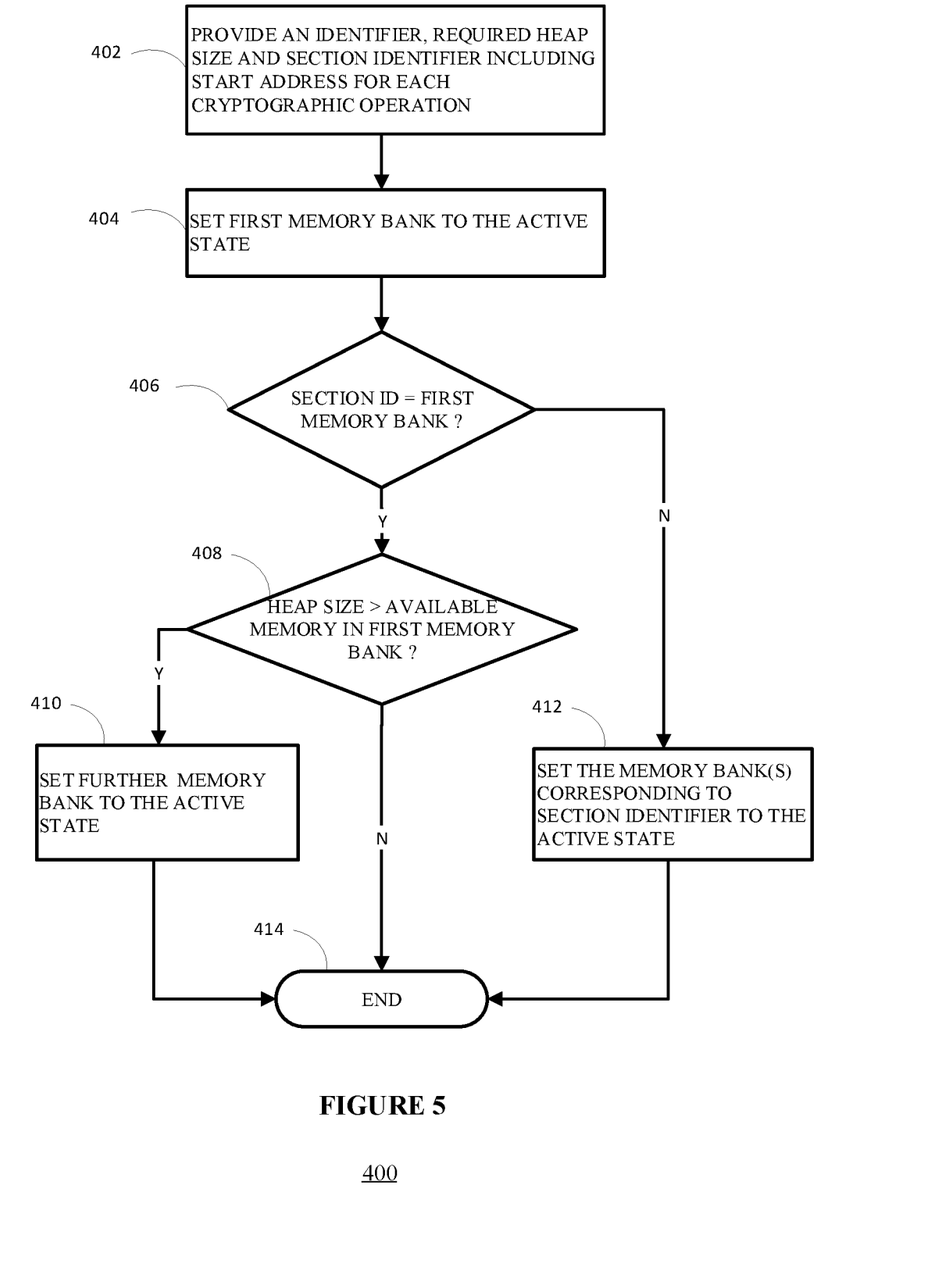
FIG. 5 shows a method of memory power management according to an embodiment.

FIG. 5 shows a method of memory power management 400 according to an embodiment. The method 400 may be applied to a processor system, for example the processor system 100 having multiple memory banks of SRAM. In particular, the method 400 may be applied during a wake up cycle which may be a first part of the active cycle during or after transitioning from a standby mode or low power mode for a low-power microcontrollers system.

In step 402 for each cryptographic operation an identifier, the required heap size, section identifier including start address may be provided. In step 404, a first memory bank which may be denoted as $Bank_{common}$ may be set to an active state from a retention state.

Following step 404, in step 406 a check may be made to determine whether the section identifier corresponds to the first memory bank $Bank_{common}$. The first memory bank $Bank_{common}$ may also be referred to as the crypto-session memory bank. Part of $Bank_{common}$ is used to store crypto-session information. The section identifier corresponding to $Bank_{common}$ may be denoted as $S_{common}$.

If the section identifier is equal to $S_{common}$ the method proceeds to step 408 where a comparison is made between the predetermined heap size and the available memory in the first memory bank. If the predetermined heap size is greater than available memory, the method proceeds to step 410 and a second memory bank may transition to an active state from a down state. Following step 410 the method 400 terminates at step 414.

Returning to step 408, if the heap size is less than or equal to the available memory in the first memory bank, the method proceeds straight to step 414 where the process terminates.

Returning now to step 406, if the section identifier does not correspond to the first memory bank, the method proceeds to step 412 and a memory bank corresponds to the address indicated by the section identifier transitions to an active state from a power down state. Successive memory banks after the first memory bank identified by the section identifier may also be used depending on the predetermined heap size provided in step 402. These memory banks may transition to the active state from a power-down state. Following step 412, the method 400 proceeds to step 414 and terminates.

Method 400 may be implemented for example in software executable on a central processor included as part of a processor system which implements the power management method 400 before each crypto operation.

Figure 6:
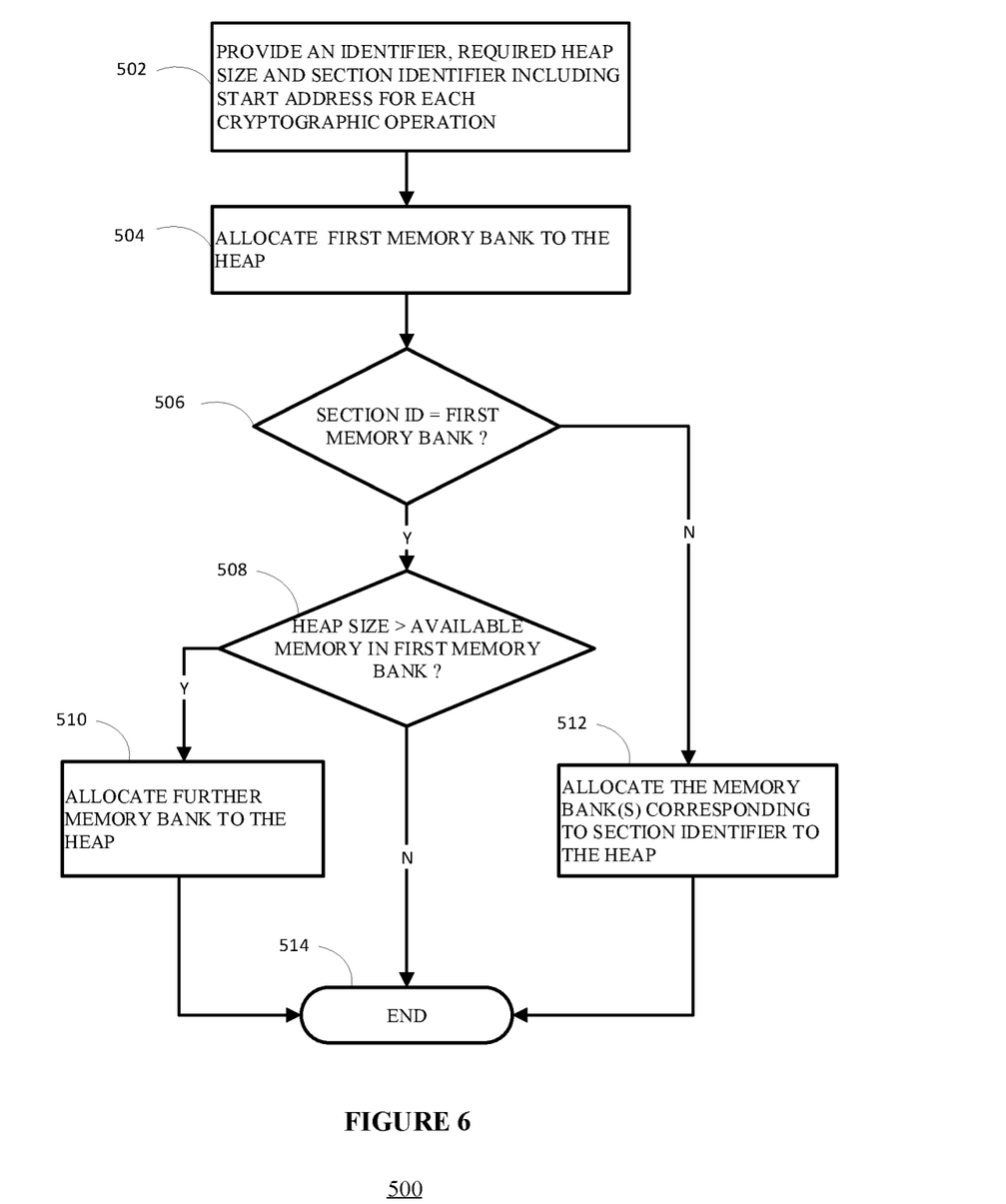
FIG. 6 illustrates a method of heap allocation for memory power management according to an embodiment.

FIG. 6 shows a method of memory heap allocation 500 according to an embodiment. The method 500 may be applied to a processor system, for example the processor system 100 having multiple memory banks of SRAM. The memory heap allocation method 500 is complementary to the power management method 400. In particular, the method 500 may be applied during a wake up cycle for a low-power microcontrollers system.

In step 502 for each cryptographic operation implemented by the processor system, an identifier, the required heap size and a section identifier including a start address may be provided. In step 504, a first memory bank $Bank_{common}$ may be allocated to the heap. The first memory bank may also be referred to as the crypto-session memory bank In step 506 a check may be made to determine whether the section identifier corresponds to the first memory bank $Bank_{common}$ which may be in a retention state. The section identifier corresponding to $Bank_{common}$ may be denoted as $S_{common}$ If the section identifier is equal to $S_{common}$, the method proceeds to step 508 where a comparison is made between the predetermined heap size and the first memory bank size.

If the predetermined heap size is greater than the available memory in the first memory the method proceeds to step 510 and a second memory bank may be allocated to the heap. $Bank_{common}$ already stores the crypto-session information so some space is not available for the heap. Following step 510 the method 500 terminates at step 514. Returning to step 508, if the heap size is less than or equal to the first memory bank size, the method proceeds straight to step 514 where the process terminates. In some examples in addition to the second memory bank, further memory banks may be allocated.

Returning now to step 506, if the section identifier does not correspond to the first memory bank, the method proceeds to step 512 and a memory bank corresponding to the memory bank having an address indicated by the section identifier is allocated to the heap. Successive memory banks after the first memory bank identified by the section identifier may also be allocated to the heap depending on the predetermined heap size provided in step 502. Following step 512, the method 500 proceeds to step 514 and terminates.

Method 500 may be implemented for example in software executable on a processor which implements the heap allocation method 500 before each crypto operation.

Figure 7:
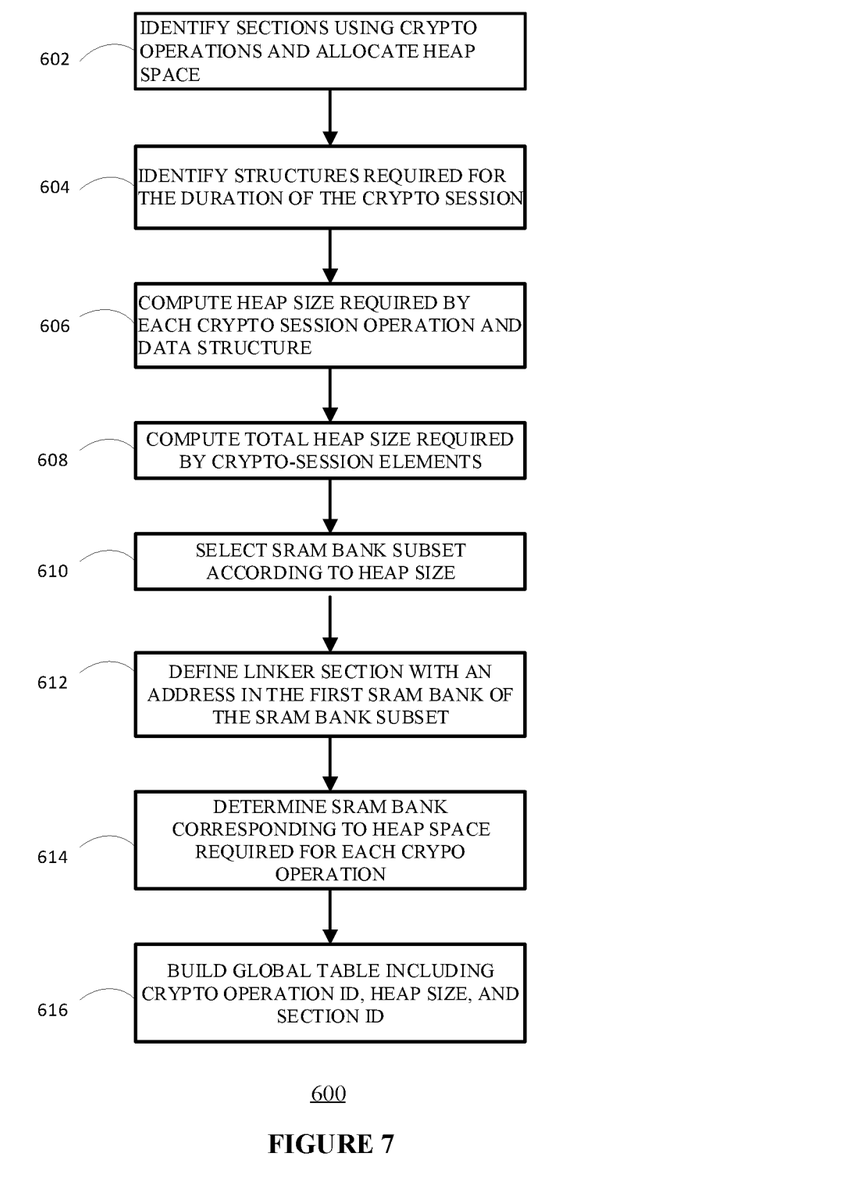
FIG. 7 shows a method of determining the heap sections and heap size for memory power management according to an embodiment.

FIG. 7 shows a method 600 of determining a crypto operation identifier according to an embodiment. In step 602, the main sections of the application that use crypto operations and allocates heap space are identified. This identification step may be done for example by static code analysis. The delimiter for these sections may be a power-down cycle in which a device may transition to a lower power operating mode such as a sleep or standby mode. An identifier may be assigned for each crypto operation denoted as crypto_op_id.

For example two sections like these could be represented by a datagram transport layer security (DTLS) handshake and a decrypt operation separated by a power-down cycle. The following notation is used for these crypto operations: Op1, Op2, ..., Opn.

In step 604, the structures that are kept for the duration of the whole crypto session may be identified. The following notation is used for these structures: C1, C2 ..., Cn. An identifier (id) may be assigned for each of these structures (struct_id).

In some examples, the public key of a peer obtained after a DTLS handshake might be a crypto-session element. This public key may be used for multiple encrypt operations.

In step 606 using run-time analysis, the maximum heap space required by each of these crypto operations and data structures may be determined.

For example, the DTLS handshake operation could require 8 Kb of SRAM, while a decrypt operation could require only 3 Kb of SRAM. The following notation is used for illustrating the required heap space by a specific crypto operation: Heap(Op1)=11 Kb, Heap(Op2)=3 Kb.

For example, the size of a peer public key may be around 0.25 Kb: Heap(C1)=0.25 Kb.

In step 608 a linker file may be built. At this step 608, the Total heap size required by the crypto-session elements may be determined: Heap(C1)+Heap(C2)+ ... +Heap(Cn)=Ctotal Kb.

The most advantageous power-save solution from a SRAM perspective that can accommodate $C_{total}$ Kb may be computed by choosing a continuous SRAM bank subset which can accommodate the $C_{total}$ Kb and which minimize the amount of unused SRAM space.

For example, if $C_{total}$<4 Kb, a single 4 Kb SRAM bank may be chosen. As a further example, if $C_{total}$ is 9 Kb, a 4 Kb and a 8 Kb SRAM module may be chosen instead of a 16 Kb SRAM module. Two modules, one of 4 Kb and one of 8 Kb, typically require less power than a 16 Kb module. The SRAM banks chosen may be contiguous or non-contiguous.

In step 612 a linker section having as starting point address the first SRAM bank chosen before is defined. This section is denoted $S_{common}$ as previously described.

In step 614, the unused space available in the SRAM banks kept for the crypto-session elements is computed: This space may be computed using the formula:

$$\text{Total size of the crypto-session banks} - C_{total} \text{ Kb} = C_{unused} \text{ Kb}.$$

For example if $C_{total}$=1 Kb and a single 4 Kb SRAM bank is chosen then $C_{unused}$=3 Kb; The heap space needed for each crypto operation Heap(Opi) is identified. The best option from below may be chosen:
 (i) The SRAM banks are chosen right after the banks allocated for the $S_{common}$ section: The most advantageous power-save solution from a SRAM perspective that can accommodate Heap(Opi)–$C_{unused}$ is computed.
 (ii) The SRAM banks are not chosen right after the banks allocated for the $S_{common}$ section: The most advantageous power-save solution from a SRAM perspective that can accommodate Heap(Opi) is computed. In this case a new section (section_id) is defined in the linker file having as starting point address the first SRAM bank from this selection. The following notation is used for this section: $S_{uncommon}$.

For example, consider the SRAM banks have the following placement: 4 Kb, 8 Kb, 16 Kb. Consider that $C_{unused}$=3 Kb and the starting address for $S_{common}$ is the beginning address for the 4 Kb bank.
 If Heap(Opi) requires 9 Kb then the 8 Kb memory bank following the 4 Kb bank may be used;
 If Heap(Opi) requires 15 Kb then the 16 Kb bank must be powered in addition to the 4 Kb bank;
 In step 616 a global table (notation: Op_table) may be built with entries of the following type:
 crypto_op_id|heap_size|section_id;
 crypto_op_id: the identifier of the crypto operation;
 heap_size: Required heap size for the crypto operation (Heap(Opi))
 section_id: The address of the SRAM bank that will be used as starting point for the memory required by the current operation.

This global table may be used for example by power management method 400 and heap allocation method 500.

Figure 8:
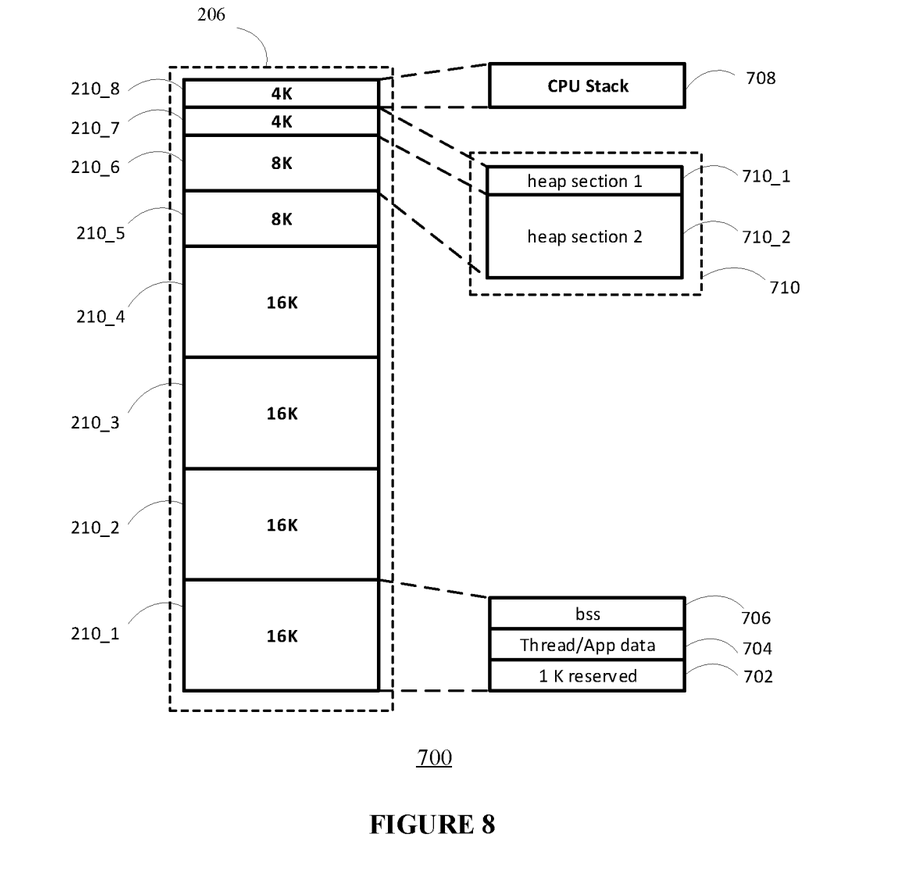
FIG. 8 shows a memory placement of linker sections for a processor system according to an embodiment.

FIG. 8 shows a linker placement 700 according to an example embodiment. Linker placement as illustrated is for the same application used for linker placement 250 using the memory banks of FIG. 2.

One bank of 16 Kb 210_1 is used for a reserve section 702, the Thread and Application Data 704, and the bss section 706. The stack 708 is allocated to 4K memory bank 210_8. The heap section 710 is allocated in two sections. A first heap section 710_1 is allocated to a 4 K memory bank 210_7 and a second heap section 710_2 is allocated to an 8K section 210_6. Instead of using a 16 Kb SRAM bank for the heap and wasting more than 4 Kb, two SRAM banks 210_7, 210_6, one of 4 Kb and one of 8 Kb, are used and no space is wasted.

During sleep cycles, the 4 Kb bank 210_7 is kept in retention mode (for keeping the crypto-session structures) while the 8 Kb bank 210_6 is totally shut down. So instead of keeping one 16 Kb SRAM bank in retention most of the time, only a 4 Kb SRAM bank is kept in retention;

During wake-up cycles, there are times when the banks allocated for the heap are kept in retention/down state if no heap space is needed. In the previous approach, the 16 Kb SRAM banks always transition to an active state;

During wake-up cycles, there are times when only the 4 Kb SRAM bank 210_7 transitions to an active state while the 8 Kb SRAM bank 210_6 is kept in a down state. It will be appreciated that in other examples, the memory banks may have different sizes to those illustrated.

Embodiments describe a method and apparatus for partitioning the heap space by maximizing the hardware capabilities of SRAM modules. Embodiments may selectively activate memory banks only when needed and it can dynamically adapt the number of used banks such that this number is kept at a minimum. Embodiments described herein are directed to power management for SRAM memories. However, it will be appreciated that the method may be applied to other volatile memory types such as DRAM. with a low power retention mode where only refresh is performed and bus access is disabled The required space for each crypto operations may be precomputed such that the heap space can be split in multiple regions by taking into consideration the size of the SRAM banks. Using methods described herein, the smallest memory bank may be set in the active state only when a crypto computation is imminent. A linker file according to one or more embodiments may define more than one section for the heap by taking into consideration the SRAM architecture. A heap-allocation method according to one or more embodiments may allocate the crypto-session information in the smallest possible SRAM region. In some examples this region may not be the smallest SRAM bank. A power management method according to one or more embodiments may determine during wake cycles which SRAM bank or banks corresponding to the heap should be transitioned to an active state and during sleep cycles determine which SRAM bank corresponding to the heap should be transitioned wither to a retention state or power down state.

Processor systems according to some examples may be configured as IoT devices. In some examples, processor systems may be configured to use OpenThread and or Zigbee software stacks. In some examples the processor system may be configured to operate as network node clients requiring high level of security and which have relatively long inactive periods.

A method of power management in a processor system is described. The processor system includes a processor coupled to a memory comprising a plurality of memory banks. The memory has a region configurable as a heap region. The processor system is operable to execute instructions comprising one or more cryptographic operations. At least one memory bank is allocated to the heap region dependent on a predetermined memory size required for execution of at least one cryptographic operation. At least one further memory bank is allocated to the heap region. The processor system may switch between first and second operating states. The first operating state has a lower power consumption than the second operating state. The processor system switches between a first and second operating mode by setting at least one memory bank and at least one further memory bank to an active state. The processor system switches between the second and first operating mode by setting at least one memory bank to a retention state and the at least one further memory bank to a power-down state.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of power management for a processor system including a processor coupled to a memory comprising a plurality of memory banks, the memory further comprising a region configurable as a heap region, wherein the processor is operable to execute instructions comprising one or more cryptographic operations; and wherein the method comprises:
   allocating at least one memory bank to the heap region dependent on a predetermined memory size required for execution of at least one cryptographic operation;
   allocating at least one further memory bank to the heap region; and
   switching from a first operating mode to a second operating mode by:
      setting the at least one memory bank to an active state;

setting the at least one further memory bank to an active state; and
switching from the second operating mode to the first operating mode by:
setting the at least one memory bank to a retention state;
setting the at least one further memory bank to a power-down state.

2. The method of claim 1 wherein the at least one memory bank is configured to store a public key.

3. The method of claim 2 wherein the at least one cryptographic operation comprises a transport layer security (TLS) handshake operation.

4. The method of claim 1 wherein the at least one cryptographic operation comprises at least one of an encryption operation and a decryption operation.

5. The method of claim 1 wherein the at least one memory bank and the at least one further memory bank are non-contiguous.

6. The method of claim 1 wherein allocating at least one memory bank to the heap region further comprises dividing the heap region into a plurality of sections, each section corresponding to a respective memory bank.

7. The method of claim 6 further comprising providing an identifier for each cryptographic operation, providing the required heap size for each cryptographic operation and providing a section identifier comprising the address of a memory bank used as a starting point for each cryptographic operation.

8. The method of claim 7 further comprising switching from the first operating mode to the second operating mode by:
setting a first memory bank to the active state;
checking whether the section identifier corresponds to the first memory bank;
in response to the section identifier corresponding to the first memory bank, determining whether the heap size exceeds the available memory in the first memory bank;
in response to the heap size exceeding the available memory in the first memory bank, setting a second memory bank to the active state;
in response to the section identifier not corresponding to the first memory bank, setting a third memory bank corresponding to the section identifier to the active state.

9. The method of claim 7 further comprising:
checking whether the section identifier corresponds to the first memory bank;
allocating the first memory bank to the heap region;
in response to the section identifier corresponding to the first memory bank, determining whether the heap size exceeds the available memory in the first memory bank;
in response to the heap size exceeding the available memory in the first memory bank, allocating a second memory bank to the heap region;
in response to the section identifier not corresponding to the first memory bank, allocating a third memory bank corresponding to the section identifier to the heap region.

10. The method of claim 1 further comprising determining the predetermined memory size required for execution of at least one cryptographic operation by:
determining the memory size to store the crypto-session elements for the at least one cryptographic operation;
determining the memory size to store the at least one cryptographic operation.

11. The method of claim 10 wherein determining the predetermined memory size required for execution of at least one cryptographic operation further comprises running a static code analysis and a run-time code analysis.

12. A processor system comprising a processor coupled to a memory comprising a plurality of memory banks, the memory further comprising a region configurable as a heap region, wherein the processor is operable to execute instructions comprising one or more cryptographic operations; and wherein the processor system is configured to:
allocate at least one memory bank to the heap region dependent on a predetermined memory size required for execution of at least one cryptographic operation;
allocate at least one further memory bank to the heap region; and
further configured to switch from a first operating mode to a second operating mode by:
setting the at least one memory bank to an active state;
setting the at least one further memory bank to an active state; and
to switch from the second operating mode to the first operating mode by:
setting the at least one memory bank to a retention state;
setting the at least one further memory bank to a power-down state.

13. The processor system of claim 12 further configured to provide an identifier for each cryptographic operation, provide the required heap size for each cryptographic operation and provide a section identifier comprising the address of a memory bank used as a starting point for each cryptographic operation.

14. The processor system of claim 13 further configured to switch from the first operating mode to the second operating mode by:
setting a first memory bank to the active state;
checking whether the section identifier corresponds to the first memory bank;
in response to the section identifier corresponding to the first memory bank, determining whether the heap size exceeds the available memory in the first memory bank;
in response to the heap size exceeding the available memory in the first memory bank, setting a second memory bank to the active state;
in response to the section identifier not corresponding to the first memory bank, setting a third memory bank corresponding to the section identifier to the active state.

15. The processor system of claim 13 further configured to:
check whether the section identifier corresponds to the first memory bank;
allocate the first memory bank to the heap region;
in response to the section identifier corresponding to the first memory bank, determining whether the heap size exceeds the available memory in the first memory bank;
in response to the heap size exceeding available memory in the first memory bank;
allocating a second memory bank to the heap region;
in response to the section identifier not corresponding to the first memory bank, allocating a third memory bank corresponding to the section identifier to the heap region.

16. A non-transitory computer readable media comprising a computer program comprising computer executable instructions which, when executed by a processor system including a processor coupled to a memory comprising a plurality of memory banks, causes the processor to perform the steps of
- allocating at least one memory bank to the heap region dependent on a predetermined memory size required for execution of at least one cryptographic operation;
- allocating at least one further memory bank to the heap region; and
- switching from a first operating mode to a second operating mode by:
  - setting the at least one memory bank to an active state;
  - setting the at least one further memory bank to an active state; and
- switching from the second operating mode to the first operating mode by:
  - setting the at least one memory bank to a retention state;
  - setting the at least one further memory bank to a power-down state.

17. The non-transitory computer readable media of claim 16 further comprising computer executable instructions which causes the processor to perform the steps of allocating at least one memory bank to the heap region further comprises dividing the heap region into a plurality of sections, each section corresponding to a respective memory bank.

18. The non-transitory computer readable media of claim 17 further comprising computer executable instructions which causes the processor to perform the steps of providing an identifier for each cryptographic operation, providing the required heap size for each cryptographic operation and providing a section identifier comprising the address of a memory bank used as a starting point for each cryptographic operation.

19. The non-transitory computer readable media of claim 18 further comprising computer executable instructions which causes the processor to perform the steps of switching from the first operating mode to the second operating mode by:
- setting a first memory bank to the active state;
- checking whether the section identifier corresponds to the first memory bank;
- in response to the section identifier corresponding to the first memory bank, determining whether the heap size exceeds the available memory in the first memory bank;
- in response to the heap size exceeding the available memory in the first memory bank, setting a second memory bank to the active state;
- in response to the section identifier not corresponding to the first memory bank, setting a third memory bank corresponding to the section identifier to the active state.

20. The non-transitory computer readable media of claim 18 further comprising computer executable instructions which causes the processor to perform the steps of:
- checking whether the section identifier corresponds to the first memory bank;
- allocating the first memory bank to the heap region;
- in response to the section identifier corresponding to the first memory bank, determining whether the heap size exceeds the available memory in the first memory bank;
- in response to the heap size exceeding the available memory in the first memory bank, allocating a second memory bank to the heap region;
- in response to the section identifier not corresponding to the first memory bank, allocating a third memory bank corresponding to the section identifier to the heap region.

* * * * *